US012460929B2

(12) United States Patent  
Almodovar

(10) Patent No.: US 12,460,929 B2  
(45) Date of Patent: Nov. 4, 2025

(54) LASER MEASURING STAKEOUT DEVICE

(71) Applicant: Bryan Almodovar, Panama City Beach, FL (US)

(72) Inventor: Bryan Almodovar, Panama City Beach, FL (US)

( * ) Notice: Subject to any disclaimer, the term of this patent is extended or adjusted under 35 U.S.C. 154(b) by 372 days.

(21) Appl. No.: 18/143,295

(22) Filed: May 4, 2023

(65) Prior Publication Data

US 2024/0369360 A1 Nov. 7, 2024

(51) Int. Cl.
*G01C 15/00* (2006.01)

(52) U.S. Cl.
CPC .................. *G01C 15/004* (2013.01)

(58) Field of Classification Search
CPC ................. G01C 15/004; B23Q 3/00
USPC ........... 33/1 G, 286, 290; 269/289 R, 71, 53; 248/220.1, 251, 309.1
See application file for complete search history.

(56) References Cited

U.S. PATENT DOCUMENTS

| | | | |
|---|---|---|---|
| 3,790,277 A * | 2/1974 | Hogan ..................... | G01C 5/00 356/141.2 |
| 4,333,242 A * | 6/1982 | Genho, Sr. ............. | G01B 11/27 33/290 |
| 4,703,563 A * | 11/1987 | Hoshino .............. | G01C 15/004 33/227 |
| 5,748,306 A * | 5/1998 | Louis ..................... | G01B 11/26 356/153 |
| 5,864,956 A * | 2/1999 | Dong .................... | G01C 15/105 33/286 |
| 5,984,768 A * | 11/1999 | Tolley ................... | B24B 41/065 451/365 |
| 6,202,312 B1 * | 3/2001 | Rando .................. | G01C 15/004 356/138 |
| 6,931,737 B1 * | 8/2005 | Liao ...................... | G01C 15/004 33/286 |
| 7,621,053 B2 * | 11/2009 | Bianchin ................. | B25H 7/00 33/16 |
| 7,740,220 B2 * | 6/2010 | Jeanveau ............ | E04H 12/2269 248/534 |
| 7,748,126 B2 * | 7/2010 | Lu ......................... | G01C 15/004 33/286 |
| 7,784,192 B2 * | 8/2010 | Jancic ....................... | F41G 1/35 33/286 |
| 8,266,807 B2 * | 9/2012 | Olsen ..................... | G01C 15/12 33/286 |
| 8,720,839 B2 * | 5/2014 | Lijesnic ............ | A47B 47/0033 403/231 |
| 9,441,963 B2 * | 9/2016 | Yuen ..................... | G01C 15/004 |
| 10,488,197 B2 * | 11/2019 | Finkelstein .......... | G01C 15/006 |

(Continued)

*Primary Examiner* — George B Bennett  
(74) *Attorney, Agent, or Firm* — The Rapacke Law Group, P.A.

(57) ABSTRACT

A laser measuring stakeout device may include a sleeve having a first end opposite a second end and defining a throughhole from the first end to the second end. The sleeve further defining at least one threaded perforation to receive a bolt therein, the secure the sleeve to a pole. The laser measuring stakeout device may further include a plurality of fixtures attached to the sleeve for attaching laser measuring devices thereon, or integrating laser measuring devices therein. The laser measuring stakeout device may further include at least one hook for attaching a string thereon to draw a string from one laser measuring stakeout device to another.

20 Claims, 4 Drawing Sheets

(56) References Cited

U.S. PATENT DOCUMENTS

| | | | | |
|---|---|---|---|---|
| 11,662,432 | B2* | 5/2023 | Elran | G06T 17/00 |
| | | | | 33/286 |
| 12,194,613 | B2* | 1/2025 | Nair | B25H 3/04 |
| 2005/0198845 | A1* | 9/2005 | Robinson | G01C 15/004 |
| | | | | 33/227 |
| 2011/0002110 | A1* | 1/2011 | Skull | B32B 7/12 |
| | | | | 361/825 |
| 2013/0194793 | A1* | 8/2013 | Bertsch | G01C 15/004 |
| | | | | 362/231 |
| 2022/0395963 | A1* | 12/2022 | Draeger | B25B 5/102 |
| 2024/0118079 | A1* | 4/2024 | Schmittdiel | G01C 15/004 |
| 2025/0044087 | A1* | 2/2025 | Walpac | G01C 15/004 |

* cited by examiner

LASER MEASURING STAKEOUT DEVICE

TECHNICAL FIELD

The embodiments generally relate to devices for measuring and planning building foundations or any other building task that requires precise measurement of dimensions or angles.

BACKGROUND

Contractors use wooden stakes and strings to mark walls and corners of foundations when preparing to construct a building. This method is time consuming and risky because of a high likelihood of mismeasurement. Additionally, waste is created as wooden stakes are not usable.

Alternatives include costly global positioning satellite-based systems.

SUMMARY OF THE INVENTION

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

The embodiments described herein provide a laser measuring stakeout device used when staking the foundations of homes and other structures to ensure the structure is squared. The device allows for distance measures to be taken using laser measuring devices positioned at a 90° angle relative to one another while avoiding misalignments on a foundation which can cause various future problems when building the structure.

BRIEF DESCRIPTION OF THE DRAWINGS

A complete understanding of the present embodiments and the advantages and features thereof will be more readily understood by reference to the following detailed description when considered in conjunction with the accompanying drawings wherein.

Figure 1:
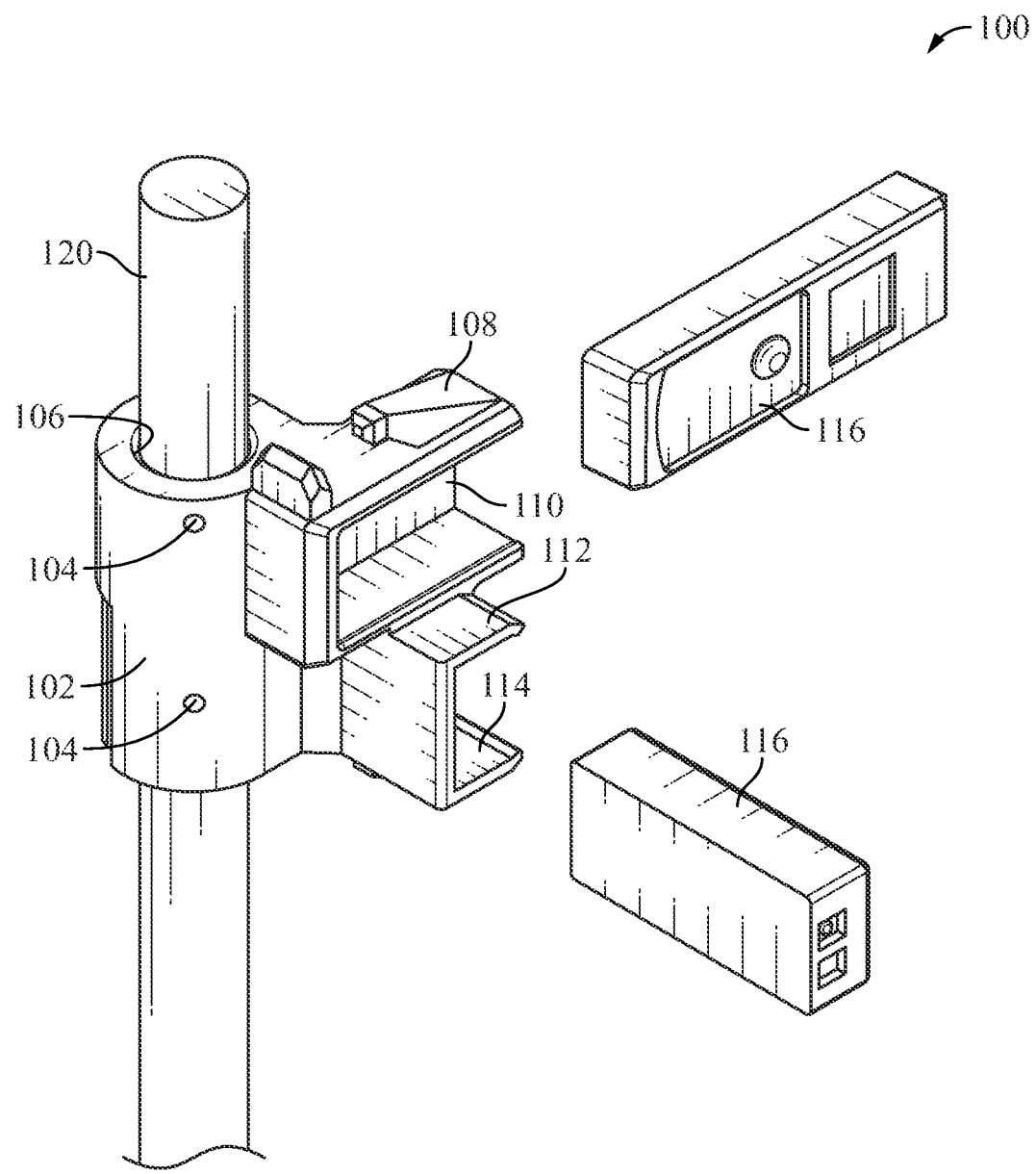
FIG. 1 illustrates a perspective view of a stakeout device, according to some embodiments.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are to the described apparatus. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the apparatus. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the single embodiment or variety of embodiments described herein are set forth in this application. Any specific details of the embodiments are used for demonstration purposes only, and no unnecessary limitation or inferences are to be understood therefrom. Furthermore, as used herein, relational terms, such as "first" and "second," "top" and "bottom," and the like, may be used to distinguish one entity or element from another entity or element without necessarily requiring or implying any physical or logical relationship, or order between such entities or elements. As used herein, "pole" or "stake" may refer to any of a stake, pole, shaft, projection, or other similar elongated object.

In general, the embodiments relate to a laser measuring stakeout device that is re-usable, affordable, timesaving, compact, and easy to use.

In general, the embodiments relate to a laser measuring stakeout device including a sleeve to receive an approximately ¾ inch diameter metal pipe stake, pole, or shaft. The pole may be approximately ½ inch in diameter, 1 inch in diameter, or another dimension.

The stakeout device may include a sleeve that may include fixtures for laser measuring devices to be attached at a 90-degree position relative to the sleeve. The sleeve may be constructed and arranged to slide onto a pole. The sleeve has perforations for a hand tightened bolt to secure device on metal pipe stake. Metal pipe stakes may be about four feet long and capped on a first end. The second end may be embedded into the ground and may include a spike or tapered end to facilitate positioning the pole in the ground.

The stakeout device may also include hooks on both ends in case of strings to be used. Hooks may be arranged at approximate 45 to 90 degrees from either of the integrated laser measuring devices. String may be used to confirm the accuracy of laser level devices used in conjunction with the stakeout device.

The stakeout device may be constructed and arranged to seat or partially house or hold laser measuring devices that may slide into the stakeout device. According to some embodiments, the stakeout device may be constructed and arranged to integrate laser measuring devices therein. The stakeout device may slide onto a pole and may include a centerline indicator that marks the centerline of the stake.

The stakeout device may be made of polylactic acid or polylactide (PLA), but may include other materials like Aluminum, ABS, or other materials.

During use, the user locates one corner within a parcel of real property where the foundation will be placed. The metal stake is driven into the ground with the measuring device attached to it. The measuring device may also have bubble levels to indicate that the stake is level. Next, the user drives the metal stake roughly 24" into the ground with a hammer and swivels the device and slide up and down to orientate the house as desired. The device is then locked with the hand tightened bolts on the sleeve to the metal stake. A user may then turn on both measuring devices, locate the next two corners of foundation following construction plans. This will secure perfect alignment when marking foundations.

FIG. 1 illustrates a perspective view of a stakeout device 100 consistent with this disclosure that may include a sleeve 102 having a first end opposite a second end and defining a throughhole 106 from the first end to the second end. The sleeve 102 may further define at least one threaded perforation 104 configured to receive a threaded bolt or key therein, to secure the sleeve 102 to a stake 120. The stakeout device 100 may include a first bracket 108 and a second bracket 112, the first bracket 108 and the second bracket 112 defining a first mounting channel 110 and second mounting channel 114, respectively. The first bracket 108 and a second bracket 112 may be positioned on the sleeve 102 approximately ninety degrees from one another, such that the first mounting channel 110 and second mounting channel 114 are approximately perpendicular to one another. Laser measuring tools 116 may be slidably mounted within the first mounting channel 110 and second mounting channel 114. Laser measuring tools 116 may be mounted within the first mounting channel 110 and second mounting channel 114 or may otherwise be integrated into the first bracket 108 and second bracket 112.

Figure 2:
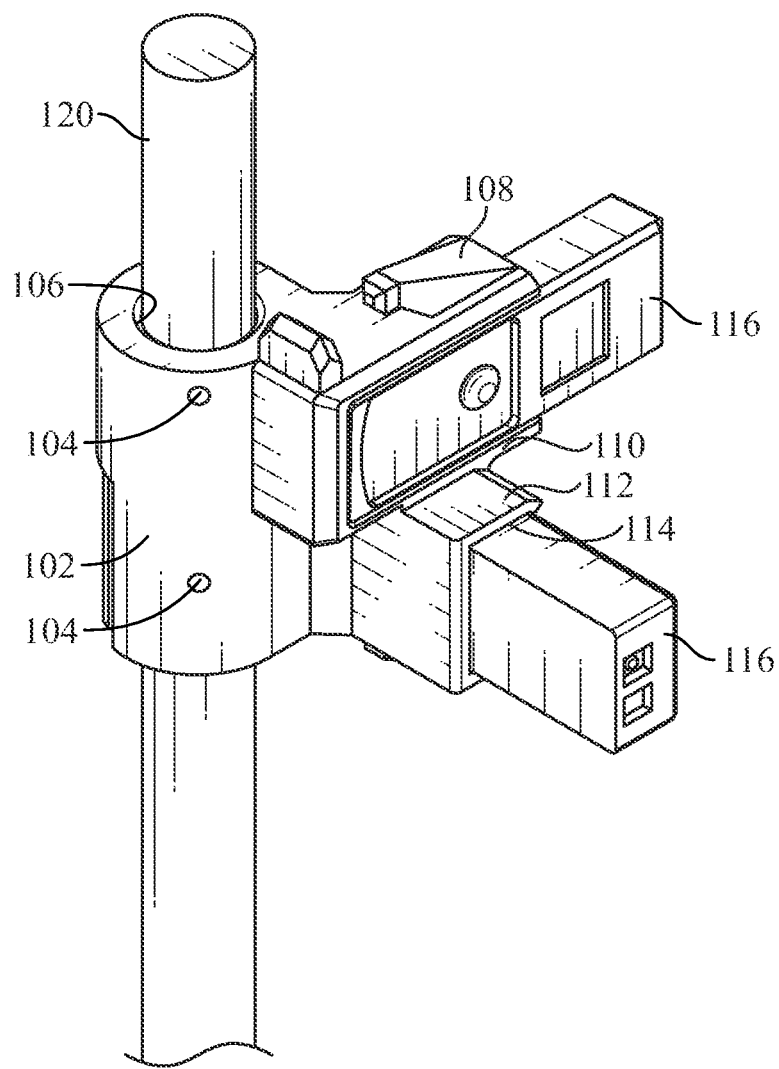
FIG. 2 illustrates a perspective view of a stakeout device, according to some embodiments.

FIG. 2 illustrates a perspective view of a stakeout device 100 consistent with this disclosure. Laser measuring tools 116 may be integrated within the first bracket 108 and the second bracket 112. The stakeout device 100 may be height-adjustable when mounted on a stake 120 whereby a user may use a threaded bolt or key to tighten the sleeve 102 onto the stake 120 at a desired height. The sleeve 102 may include protrusions 122, 124 constructed and arranged to facilitate seating of a bubble level on the stakeout device 100 to ensure that the stakeout device 100 is level during use. Protrusions 122, 124 may also function as hooks onto which string may be attached to provide additional foundation stakeout. According to some embodiments, the stakeout device 100 may include integrated vertical and horizontal bubble levels (not shown) to further facilitate leveling the device.

Figure 3B:
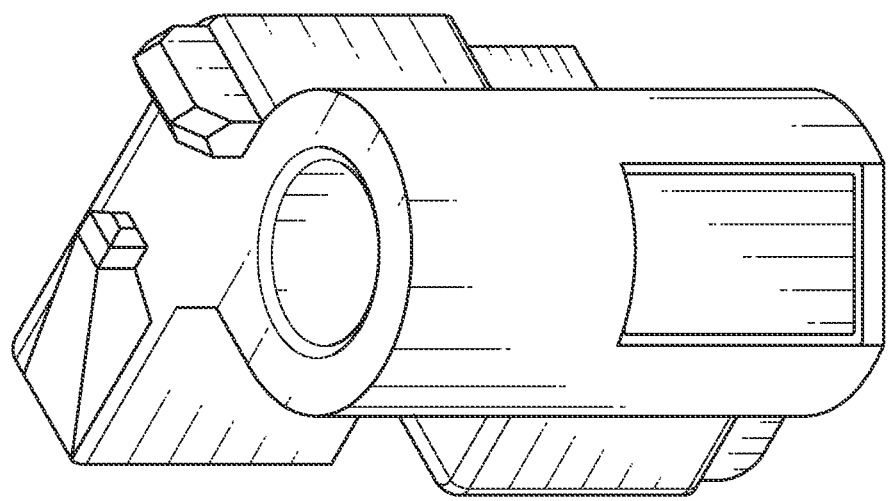
FIG. 3B illustrates a perspective view of a stakeout device, according to some embodiments.
Figure 3A:
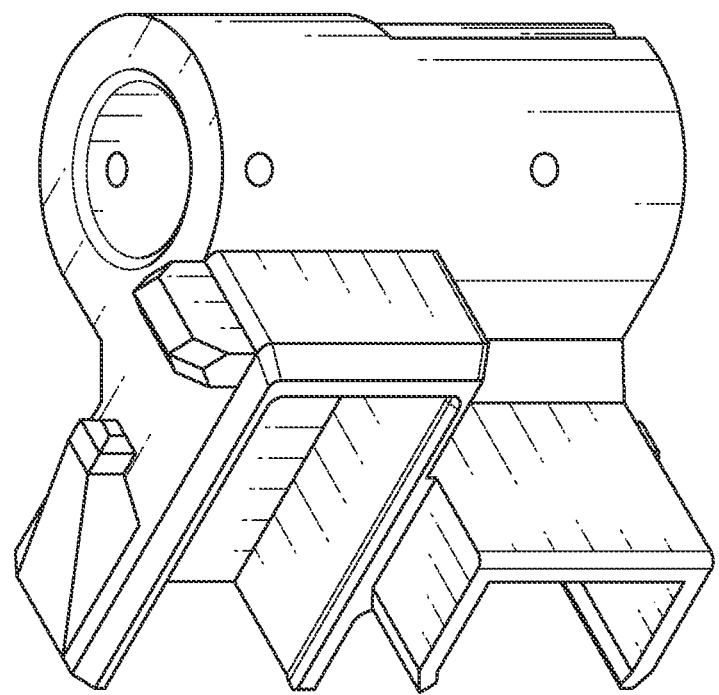
FIG. 3A illustrates a perspective view of a stakeout device, according to some embodiments.

FIG. 3A illustrates a perspective view of a stakeout device consistent with this disclosure.

FIG. 3B illustrates a perspective view of a stakeout device consistent with this disclosure.

Figure 3C:
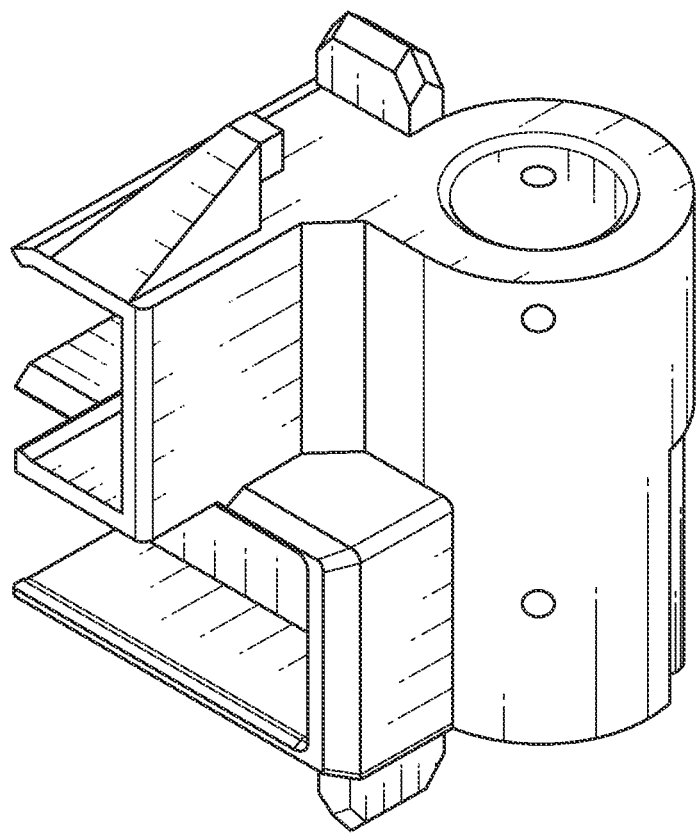
FIG. 3C illustrates a perspective view of a stakeout device, according to some embodiments.

FIG. 3C illustrates a perspective view of a stakeout device consistent with this disclosure.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and are still considered to be within the scope of the invention.

According to variation 1, a laser measuring stakeout device may include a sleeve having a first end opposite a second end and defining a throughhole from the first end to the second end, the sleeve further defining at least one threaded perforation; a first bracket defining a first mounting channel; a second bracket defining a second mounting channel, the second mounting channel being approximately perpendicular to the first mounting channel; and a key configured to be threaded into the at least one threaded perforation.

Variation 2 may include a laser measuring stakeout device as in variation 1, wherein the sleeve is configured to receive an approximately ¾" diameter metal pipe stake.

Variation 3 may include a laser measuring stakeout device as in variation 1 or 2, wherein the first mounting channel and the second mounting channel are constructed and arranged to receive at least one laser measuring device therein.

Variation 4 may include a laser measuring stakeout device as in any of variations 1 through 3, wherein the first bracket is positioned on the sleeve approximately perpendicular to the second bracket.

Variation 5 may include a laser measuring stakeout device as in any of variations 1 through 4, including at least one hook.

Variation 6 may include a laser measuring stakeout device as in any of variations 1 through 5, wherein the key is constructed and arranged to be threaded into the at least one threaded perforation to secure the laser measuring stakeout device to a pole.

Variation 7 may include a laser measuring stakeout device as in any of variations 1 through 6, wherein the sleeve includes a centerline indicator.

Variation 8 may include a laser measuring stakeout device as in any of variations 1 through 7, wherein the sleeve includes PLA.

Variation 9 may include a laser measuring stakeout device as in any of variations 1 through 8, wherein the sleeve includes at least one of PLA, ABS, or aluminum.

Variation 10 may include a laser measuring stakeout device as in any of variations 1 through 9, wherein the sleeve is generally cylindrical.

According to variation 11, a laser measuring stakeout device may include a generally cylindrical sleeve having a first end opposite a second end and defining a throughhole from the first end to the second end, the sleeve further defining at least one threaded perforation; a first bracket defining a first mounting channel; a second bracket defining a second mounting channel, the first bracket being approximately perpendicular to the second bracket and wherein the second mounting channel is approximately perpendicular to the first mounting channel; a key configured to be threaded into the at least one threaded perforation; and at least one hook.

Variation 12 may include a laser measuring stakeout device as in variation 11, wherein the sleeve is configured to receive an approximately ¾" diameter metal pipe stake.

Variation 13 may include a laser measuring stakeout device as in variation 11 or 12, wherein the first mounting channel and the second mounting channel are constructed and arranged to receive at least one laser measuring device therein.

Variation 14 may include a laser measuring stakeout device as in any of variations 11 through 13, including at least one second hook.

Variation 15 may include a laser measuring stakeout device as in any of variations 11 through 14, wherein the key is constructed and arranged to be threaded into the at least one threaded perforation to secure the laser measuring stakeout device to a pole.

Variation 16 may include a laser measuring stakeout device as in any of variations 11 through 15, wherein the sleeve includes a centerline indicator.

Variation 17 may include a laser measuring stakeout device as in any of variations 11 through 16, wherein the sleeve includes PLA.

Variation 18 may include a laser measuring stakeout device as in any of variations 11 through 17, wherein the sleeve includes at least one of PLA, ABS, or aluminum.

According to variation 19, a laser measuring stakeout device may include a generally cylindrical sleeve having a first end opposite a second end and defining a throughhole from the first end to the second end, the sleeve further defining at least one threaded perforation; a centerline indicator on the sleeve; a generally rectangular first bracket defining a first mounting channel; a generally rectangular second bracket defining a second mounting channel, the first bracket being approximately perpendicular to the second bracket and wherein the second mounting channel is approximately perpendicular to the first mounting channel; a key configured to be threaded into the at least one threaded perforation to secure the sleeve to a pole; a first hook on the first end; and a second hook on the second end.

Variation 20 may include a laser measuring stakeout device as in variation 19, wherein the laser measuring stakeout device includes at least one of PLA, ABS, or aluminum.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A laser measuring stakeout device, comprising:
   a sleeve having a first end opposite a second end and defining a throughhole from the first end to the second end, the sleeve further defining at least one threaded perforation;
   a first bracket defining a first mounting channel;
   a second bracket defining a second mounting channel, the second mounting channel being approximately perpendicular to the first mounting channel; and
   a key configured to be threaded into the at least one threaded perforation.

2. A laser measuring stakeout device as in claim 1, wherein the sleeve is configured to receive an approximately ¾" diameter metal pipe stake.

3. A laser measuring stakeout device as in claim 1, wherein the first mounting channel and the second mounting channel are constructed and arranged to receive at least one laser measuring device therein.

4. A laser measuring stakeout device as in claim 1, wherein the first bracket is positioned on the sleeve approximately perpendicular to the second bracket.

5. A laser measuring stakeout device as in claim 1, comprising at least one hook.

6. A laser measuring stakeout device as in claim 1, wherein the key is constructed and arranged to be threaded into the at least one threaded perforation to secure the laser measuring stakeout device to a pole.

7. A laser measuring stakeout device as in claim 1, wherein the sleeve comprises a centerline indicator.

8. A laser measuring stakeout device as in claim 1, wherein the sleeve comprises PLA.

9. A laser measuring stakeout device as in claim 1, wherein the sleeve comprises at least one of PLA, ABS, or aluminum.

10. A laser measuring stakeout device as in claim 1, wherein the sleeve is generally cylindrical.

11. A laser measuring stakeout device, comprising:
    a generally cylindrical sleeve having a first end opposite a second end and defining a throughhole from the first end to the second end, the sleeve further defining at least one threaded perforation;
    a first bracket defining a first mounting channel;
    a second bracket defining a second mounting channel, the first bracket being approximately perpendicular to the second bracket and wherein the second mounting channel is approximately perpendicular to the first mounting channel;
    a key configured to be threaded into the at least one threaded perforation; and
    at least one hook.

12. A laser measuring stakeout device as in claim 11, wherein the sleeve is configured to receive an approximately ¾" diameter metal pipe stake.

13. A laser measuring stakeout device as in claim 11, wherein the first mounting channel and the second mounting channel are constructed and arranged to receive at least one laser measuring device therein.

14. A laser measuring stakeout device as in claim 11, comprising at least one second hook.

15. A laser measuring stakeout device as in claim 11, wherein the key is constructed and arranged to be threaded into the at least one threaded perforation to secure the laser measuring stakeout device to a pole.

16. A laser measuring stakeout device as in claim 11, wherein the sleeve comprises a centerline indicator.

17. A laser measuring stakeout device as in claim 11, wherein the sleeve comprises PLA.

18. A laser measuring stakeout device as in claim 11, wherein the sleeve comprises at least one of PLA, ABS, or aluminum.

19. A laser measuring stakeout device, comprising:
    a generally cylindrical sleeve having a first end opposite a second end and defining a throughhole from the first end to the second end, the sleeve further defining at least one threaded perforation;
    a centerline indicator on the sleeve;
    a generally rectangular first bracket defining a first mounting channel;
    a generally rectangular second bracket defining a second mounting channel, the first bracket being approximately perpendicular to the second bracket and wherein the second mounting channel is approximately perpendicular to the first mounting channel;
    a key configured to be threaded into the at least one threaded perforation to secure the sleeve to a pole;
    a first hook on the first end; and
    a second hook on the second end.

20. A laser measuring stakeout device as in claim 19, wherein the laser measuring stakeout device comprises at least one of PLA, ABS, or aluminum.

* * * * *